(12) United States Patent
Leutert et al.

(10) Patent No.: US 10,087,787 B2
(45) Date of Patent: Oct. 2, 2018

(54) METHOD FOR PRODUCING A BUILT CAMSHAFT

(71) Applicant: Mahle International GmbH, Stuttgart (DE)

(72) Inventors: Markus Leutert, Wehr/Baden (DE); Roland Schacherer, Geisingen (DE); Christoph Steinmetz, Ludwigsburg (DE); Christoph Unrath, Urbach (DE)

(73) Assignee: Mahle International GmbH, Stuttgart (DE)

( * ) Notice: Subject to any disclaimer, the term of this patent is extended or adjusted under 35 U.S.C. 154(b) by 407 days.

(21) Appl. No.: 14/883,278

(22) Filed: Oct. 14, 2015

(65) Prior Publication Data

US 2016/0108764 A1 Apr. 21, 2016

(30) Foreign Application Priority Data

Oct. 15, 2014 (DE) .................. 10 2014 220 858

(51) Int. Cl.
*F01L 1/047* (2006.01)
*F16H 53/02* (2006.01)
(Continued)

(52) U.S. Cl.
CPC .............. *F01L 1/047* (2013.01); *F01L 1/053* (2013.01); *F01L 13/0036* (2013.01);
(Continued)

(58) Field of Classification Search
CPC ........... F01L 2013/0052; F01L 13/0036; F01L 1/047; F01L 1/053; F01L 2001/0471; F01L 2001/0475; F01L 2103/00; F01L 2001/0473; F01L 2001/0476; F01L 2001/0535; Y10T 29/49293; B23P 2700/02; F16H 53/025
See application file for complete search history.

(56) References Cited

U.S. PATENT DOCUMENTS

| | | |
|---|---|---|
| 8,844,130 B2 | 9/2014 | Scherzinger et al. |
| 2015/0135531 A1 | 5/2015 | Binder |

FOREIGN PATENT DOCUMENTS

| | | |
|---|---|---|
| DE | 102009057633 B3 | 3/2011 |
| DE | 102012105230 A1 | 12/2013 |

(Continued)

OTHER PUBLICATIONS

English abstract for DE-10212016672.
(Continued)

*Primary Examiner* — Mark Laurenzi
*Assistant Examiner* — Wesley Harris
(74) *Attorney, Agent, or Firm* — Fishman Stewart PLLC

(57) ABSTRACT

An assembled camshaft and a method for producing an assembled camshaft are disclosed. The assembled camshaft may include a camshaft main body having a longitudinal axis. The camshaft main body may include a first axial section and a second axial section disposed between the first axial section and a third axial section. The second axial section may have an outer profile including a toothing extending in an axial direction. At least one sliding cam may be arranged on the second axial section. A drive wheel may be arranged on a free end of the first axial section, and a receiving element may be arranged on at least one of the first axial section and the third axial section.

19 Claims, 2 Drawing Sheets

(51) Int. Cl.
 *F01L 1/053* (2006.01)
 *F01L 13/00* (2006.01)
(52) U.S. Cl.
 CPC ........ *F16H 53/025* (2013.01); *B23P 2700/02* (2013.01); *F01L 2001/0471* (2013.01); *F01L 2001/0473* (2013.01); *F01L 2001/0475* (2013.01); *F01L 2001/0476* (2013.01); *F01L 2001/0535* (2013.01); *F01L 2013/0052* (2013.01); *F01L 2103/00* (2013.01); *Y10T 29/49293* (2015.01)

(56) References Cited

FOREIGN PATENT DOCUMENTS

| | | |
|---|---|---|
| DE | 102012210213 A1 | 12/2013 |
| DE | 102012016672 A1 | 2/2014 |
| DE | 102012216941 A1 | 3/2014 |
| WO | WO-2010048937 A1 | 5/2010 |

OTHER PUBLICATIONS

English abstract for DE-102012210213.
English abstract for DE-102012216941.
German Search Report for DE-102014220858.0, dated Jul. 20, 2015.

METHOD FOR PRODUCING A BUILT CAMSHAFT

CROSS REFERENCE TO RELATED APPLICATIONS

This application claims priority to German Patent Application No. 10 2014 220 858.0, filed Oct. 15, 2014, the contents of which are hereby incorporated by reference in its entirety.

TECHNICAL FIELD

The present invention relates to a method for producing a built camshaft having at least one sliding cam, which is arranged on a camshaft main body in a rotationally fixed and axially displaceable manner, and having at least one element, which is arranged on the camshaft main body in a rotationally fixed and axially non-displaceable manner. The invention also relates to a camshaft built according to said method.

BACKGROUND

DE 10 2009 057 633 B3 discloses a generic method for producing a built camshaft, in which first a rod-shaped camshaft main body is provided and machined. Surface machining takes place in at least one first axial part-section by introducing an outer surface profile, which extends in an axial direction, while surface machining takes place in a second part-section situated downstream of the first part-section by widening at least some regions of the camshaft main body. Generally, excessive introduction of heat into the components and unnecessary material weak points should be avoided as far as possible during production of the built camshaft.

DE 10 2012 016 672 A1 discloses an internal combustion engine having a valve drive that has at least one main camshaft, on which at least one cam carrier is arranged in a rotationally fixed and axially displaceable manner. The main camshaft is assigned a locking device, which interacts with a locking recess assigned to the cam carrier to produce an axial retaining force. The main camshaft also has a bearing seat, at least some regions of which are arranged in a separable bearing. In this case it is provided for the locking recess, in at least one locking position of the cam carrier, to bear against a locking element of the locking device at at least two contact points that are spaced apart from each other, the bearing seat being arranged adjacently in the axial direction to a cylinder of the internal combustion engine. This should allow a cam carrier of short construction and therefore a valve drive with a small space requirement to be realised.

DE 10 2012 216 941 A1 discloses a camshaft for a variable-stroke gas exchange valve drive, which camshaft comprises an externally toothed carrier shaft and an internally toothed cam piece, which controls the gas exchange of a cylinder. The cam piece is mounted on the carrier shaft in a rotationally fixed and axially displaceable manner by means of the toothing. Furthermore, a plurality of further cams is provided, which control the gas exchange of a further cylinder and are mounted on the carrier shaft in a rotationally fixed and therefore also axially fixed manner. The carrier shaft should be substantially without teeth in the axial region of the further cylinder, the further cams being provided with an opening, the inner minimum circumscribed circle diameter of which is greater than the outer minimum circumscribed circle diameter of the carrier shaft toothing. The further cams are each fastened by means of an annular piece, which is pressed in between the carrier shaft and the opening.

DE 10 2012 105 230 A1 and DE 10 2012 210 213 A1 disclose further built camshafts having axially adjustable eccentric discs.

The production of the built camshafts known from the prior art is generally complex and expensive, for which reason the likewise complex mounting methods known from the prior art are used.

SUMMARY

The present invention is therefore concerned with the problem of specifying an improved or at least an alternative embodiment for a method of the generic type, which is in particular more cost-effective.

This problem is solved according to the invention by the subject matter of the independent claims. Advantageous embodiments form the subject matter of the dependent claims.

The present invention is based on the general concept of inverting a method for producing a built camshaft in such a manner that firstly, finished, machined components, for example cams, can be used therefor and secondly, only the parts for which machining is indispensable for subsequent functioning have to be machined on a camshaft main body. In the method according to the invention for producing a built camshaft, according to a first alternative, a camshaft main body, which can for example be formed as a hollow shaft, is provided. The camshaft main body has a first smoothly cylindrical axial section, which has an outer diameter $d_1$, a second axial section, which adjoins thereto, has teeth that extend in the axial direction and has a tip circle diameter $d_K$ and a root circle diameter $d_F$, and a third smoothly cylindrical axial section, which adjoins thereto and has an outer diameter $d_3$. In this case, $d_1 > d_K$ and $d_F > d_3$, so the camshaft main body is stepped and the outer diameter thereof decreases from the first axial section via the second to the third. In the method according to the invention, a drive wheel is first placed onto a free end of the first axial section and joined there, i.e. connected in a rotationally fixed manner to the camshaft main body. Then at least one element is thermally joined to the first axial section, it being possible for the latter to be aligned in terms of length and angle before being threaded onto the camshaft main body or before the camshaft main body is pushed through the hub of the element. Of course, it is also conceivable for an angular alignment of the at least one element that is to be joined thermally to the first axial section to take place only after the final axial position thereof has been reached. If the at least one element has reached the final position thereof on the first axial section, at least one sliding cam is pushed in an angle-aligned manner onto the second axial section of the camshaft main body. At least one further element is then joined in a length- and angle-aligned manner to the third axial section. In this case it is of course clear that the first, second and third axial sections do not have to be joined consecutively, but purely theoretically can be joined virtually simultaneously if the camshaft main body is pushed through correspondingly lined-up elements or sliding cams. With the stepped camshaft main body formed according to the invention, it is possible to join the elements or sliding cams from the same direction, as a result of which mounting can be simplified generally. The stepped configuration of the camshaft main body also produces the great advantage that the comparatively complex and therefore expensive-to-produce toothing only has to be produced in the second axial section provided therefor, as a result of which the comparatively expensive production of said toothing is limited to just the regions that are absolutely necessary for subsequent functioning.

In an advantageous development of the solution according to the invention, the camshaft main body is pushed through hubs in the sliding cams and the elements and through passage openings in a bearing frame or cylinder head cover. If the built camshaft is to be mounted subsequently in a bearing frame or cylinder head cover, the individual elements or sliding cams can be arranged with their hubs flush to form corresponding passage openings in the bearing frame or cylinder head cover and pre-positioned there so that the camshaft main body can be simply pushed through. The elements to be joined to the first and third axial sections by means of a thermally joined fit are of course heated in such a manner that they can be pushed onto the camshaft main body without problems. The elements thermally joined in the first and third axial sections can of course be formed not only as cams, but also for example as sensor wheels, bearing rings, rolling bearings, in particular ball bearings or needle bearings, or as gearwheels.

The present invention is further based on the general concept of specifying an equivalent alternative embodiment to the method for producing the built camshaft as described in the paragraphs above, in which alternative embodiment the camshaft main body is not stepped in one direction, i.e. merges from a large, via a medium to a smaller diameter, but in which a camshaft main body is used, the outer diameter of which in the first and third axial sections is smaller than in the second axial section. In the alternative method according to the invention, at least one element is then thermally joined in a length- and angle-aligned manner to the first axial section. At least one sliding cam is pushed in an angle-aligned manner on the second axial section, whereas at least one element is likewise thermally joined in a length- and angle-aligned manner on the third axial section. In contrast to the alternative production method described first, however, the drive wheel is not joined onto a free end of the first axial section until the end and not before the sliding cam or elements are joined. The built camshaft produced with this method is thereby joined from two different directions, so for example the elements of the third axial section and the sliding cam are joined from one direction and the elements of the first axial section and the drive wheel are joined from the opposite direction.

The drive wheel is expediently fixed to the camshaft main body by welding, in particular by laser welding or friction welding, by a form fit or shrink fit. With a form-fitting connection, for example a polygonal profile or a multi-toothed contour can be used, a simple friction fit by means of a thermal shrink fit of course also being possible. It is also conceivable to weld the drive wheel to the camshaft main body, but in this case attention must be paid to the amount of heat introduced.

At least one element expediently has a friction-increasing structure in the region of its hub. Such a friction-increasing structure can be introduced for example by laser structuring.

In general, in the production methods according to the invention, all the components to be joined, i.e. elements and sliding cams, can first be pre-positioned axially and in their angle position of their later corresponding position, and the elements that are to be fixed by means of a thermal shrink fit can be heated, so that all the hubs of the elements or sliding cams are aligned flush with each other. The camshaft main body can be inserted into the hubs in one go and held in its final position until a thermal shrink fit has been produced for all the elements to be joined therewith. Alternatively, it is also conceivable for the hubs of the individual elements that are to be joined to be aligned with the camshaft main body sequentially shortly before reaching said camshaft main body, as a result of which they first float in the X and Y directions and are only brought into an exact position shortly before joining.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures.

DETAILED DESCRIPTION

Figure 1:
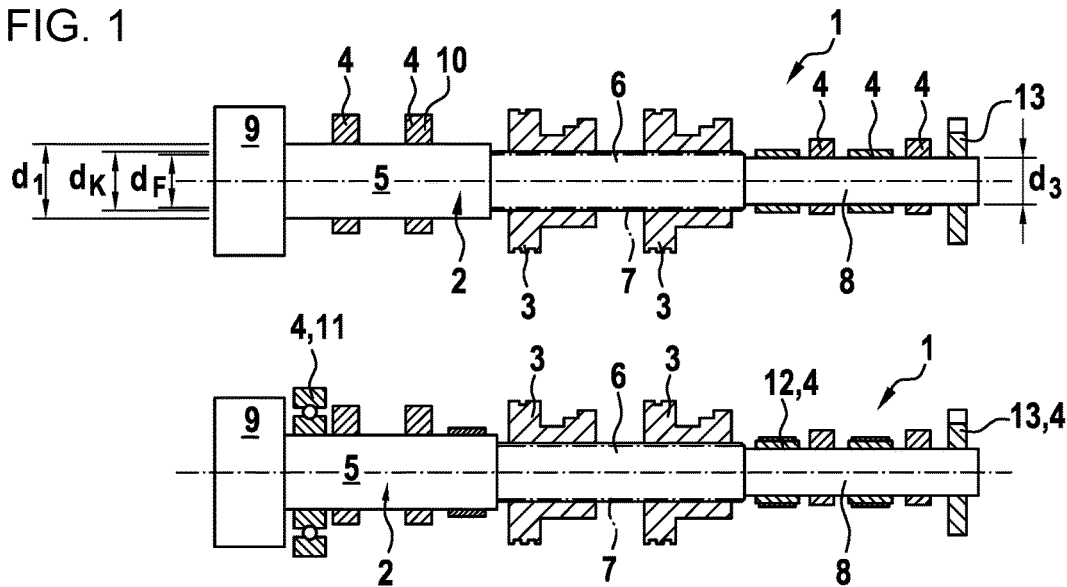
FIG. 1 schematically shows two sectional diagrams through a camshaft built according to the invention, FIG. 2A schematically shows a method according to the invention for producing the built camshaft and simultaneously installing same in a bearing frame or cylinder head cover, FIG. 2B schematically shows a diagram as in FIG. 2A, but in the fully assembled state, FIG. 3A schematically shows a diagram as in FIG. 1, but with a differently stepped camshaft main body, FIG. 3B schematically shows a diagram as in FIG. 3A, but with a mounted drive wheel.

According to FIGS. 1 to 3, a camshaft 1 according to the invention, which can be formed for example as an exhaust camshaft, has two sliding cams 3, which are each arranged in a rotationally fixed and axially displaceable manner on a camshaft main body 2. Also provided is a plurality of elements 4, which are arranged in a rotationally fixed and axially non-displaceable manner on the camshaft main body 2. The camshaft main body 2 has a first, smoothly cylindrical axial section 5 with an outer diameter $d_1$. Adjoining thereto, a second axial section 6 is provided with toothing 7 that extends in the axial direction, the toothing 7 and therefore also the second axial section 6 having a tip circle diameter $d_K$ and a root circle diameter $d_F$. On the far right, a third, smoothly cylindrical axial section 8 with an outer diameter $d_3$ adjoins. For the camshaft main body 2 shown in FIGS. 1 and 2, $d_1 > d_K$ and $d_F > d_3$, as a result of which a decreasing diameter is produced over the three axial sections 5, 6 and 8.

Figure 3A:
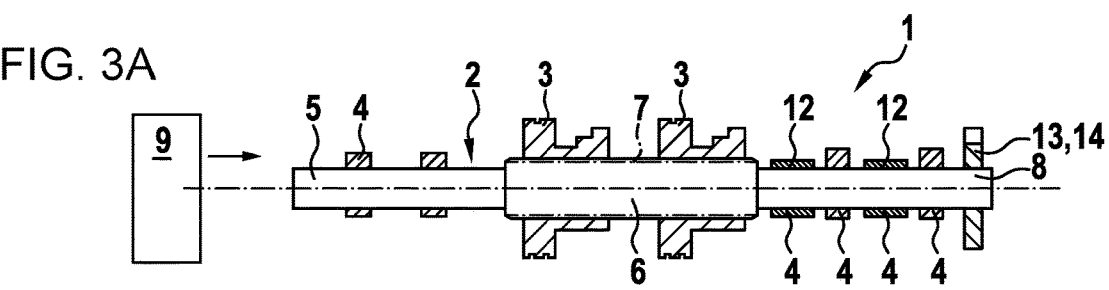
Figure 3B:
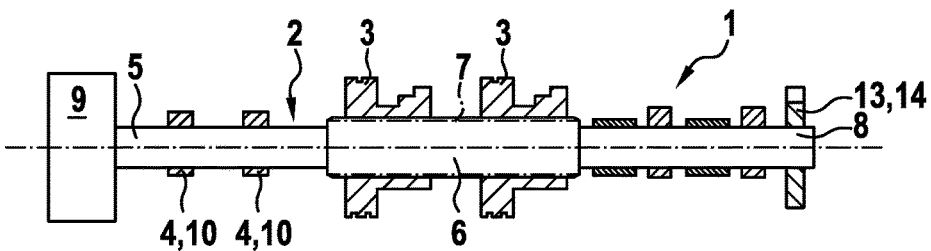

If the camshaft main body 2 of the camshaft 1 according to FIGS. 3a and 3b is viewed, it can be seen that the diameter $d_1$ of the smoothly cylindrical first axial section 5 is smaller than the root circle diameter $d_F$ of the second axial section 6. The same applies to the diameter $d_3$ of the third smoothly cylindrical axial section 8, the outer diameter $d_3$ of which is likewise smaller than the root circle diameter $d_F$ of the second axial section 6.

The camshaft 1 according to FIGS. 1 and 2 is generally assembled as follows: First, the camshaft main body 2 having the above-described dimensions is provided. Then a drive wheel 9 is joined and at least one element 4 is thermally joined to the first axial section 5 in a length- and angle-aligned manner. Then at least one sliding cam 3 is pushed onto the second axial section 6 in an angle-aligned manner and at least one element 4, for example a fixed cam, is thermally joined to the third axial section 8 in a length- and angle-aligned manner. The elements 4 can be configured for example as cams 10, as rolling bearings, in particular as ball bearings 11 or as needle bearings 12, or else as gear-wheels 13. Of course, not all the elements 4 are initially pushed onto the first axial section 5 and thermally joined there before the sliding cams 3 are pushed onto the second axial section 6 and the elements 4 are thermally joined to the third, smoothly cylindrical axial section 8. This is in particular the case if a bearing frame 14 or cylinder head cover 15 is to be joined additionally together with the elements 4 or the sliding cams 3.

Figure 2A:
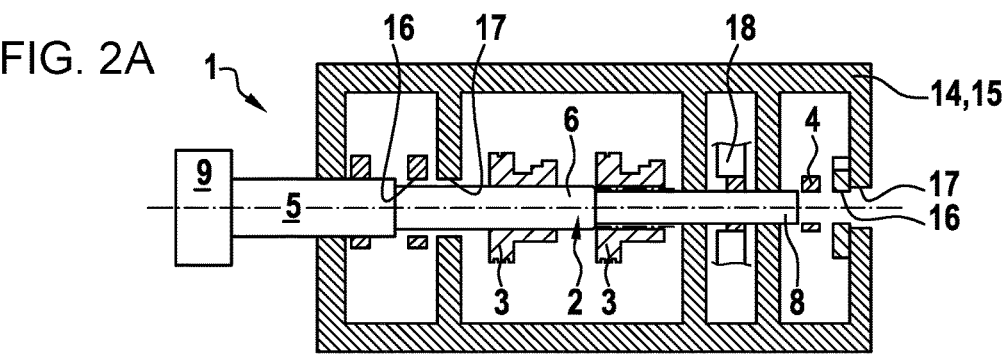
Figure 2B:
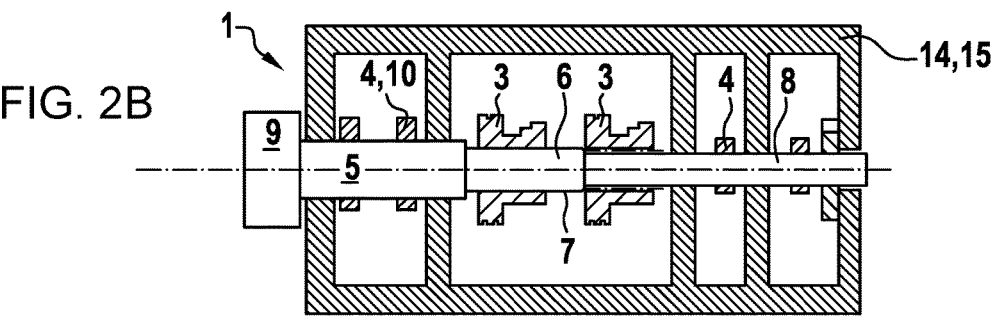

The diagrams in FIGS. 2a and 2b show the joining of the camshaft main body 2 to the sliding cams 3, the elements 4 and the bearing frame 14 or cylinder head cover 15. To this end, the elements 4 and sliding cams 3 aligned and pre-positioned with their hubs 16 flush to form passage openings 17 of the bearing frame 14 or cylinder head cover 15, i.e. held with corresponding holding devices 18, so that the camshaft main body 2 can be moved through all the hubs 16 and passage openings 17 in one go. For the sake of clarity, only a single holding device 18 is shown in FIG. 2a, it being of course clear that all the elements 4 and sliding cams 3 are held by means of corresponding holding device 18 during the joining process. Insertion can then only take place from the right according to the diagrams in FIGS. 2a and 2b.

If the camshafts 1 according to FIGS. 3a and 3b are viewed, at least one element 4 is thermally joined to the first axial section 5 in a length- and angle-aligned manner and then the sliding cam 3 is placed onto the second axial section 6 from the opposite joining direction. Then the elements 4 can be joined to the third, smoothly cylindrical axial section 8 in a length- and angle-aligned manner by means of a thermal joining fit. Finally and in contrast to the method of FIGS. 1 and 2, the drive wheel 9 is then placed onto the free end of the first axial section 5 and joined there. The drive wheel 9 can be fixed to the camshaft main body 2 for example by welding, in particular by laser welding or friction welding, by a form fit or shrink fit. The angle alignment of the individual elements 4 to be thermally joined can take place before or after they are pushed onto the camshaft main body 2.

In order to be able to increase torque transmission from the camshaft main body 2 to the respective element 4, the latter can have a friction-increasing structure, for example a laser structure, in the region of its hub 16, which effects a slight reduction in cross section. Of particular advantage in the production method according to the invention is also that all the components, i.e. for example the camshaft main body 3, the elements 4 and the sliding cams 3 are fully machined, as a result of which post-machining no longer has to take place.

Particularly inexpensive fabrication of a sliding camshaft without post-machining can be made possible with the camshaft 1 according to the invention and with the method according to the invention for producing same, it being of great advantage in particular that the toothing 7 is provided only in the region in which it is actually needed, namely in the second axial section 6. Because in particular the toothing 7 is expensive to produce, a cost advantage can be achieved thereby.

The invention claimed is:

1. A method for producing an assembled camshaft, comprising the steps of:
providing a camshaft main body having a longitudinal axis, wherein the camshaft main body includes:
a first axial section having a smooth cylindrical outer profile and an outer diameter $d_1$,
a second axial section disposed between the first axial section and a third axial section, the second axial section including a toothing extending in an axial direction, wherein the second axial section via the toothing defines a tip circle diameter $d_K$ and a root circle diameter $d_F$,
the third axial section having a smooth cylindrical outer profile and an outer diameter $d_3$,
wherein $d_1 > d_K$ and $d_F > d_3$,
joining a drive wheel to a free end of the first axial section,
thermally joining at least one receiving element to the first axial section in a predefined angular and axial position, the at least one receiving element having an opening for receiving the camshaft main body, wherein the at least one receiving element is arranged on the camshaft main body in a rotationally fixed and axially non-displaceable manner;
pushing at least one sliding cam onto the second axial section in a predefined angular position, the at least one sliding cam arranged on the camshaft main body in a rotationally fixed and axially displaceable manner; and
thermally joining at least one other receiving element to the third axial section in a predefined angular and axial position, the at least one other receiving element having an opening for receiving the camshaft main body.

2. The method according to claim 1, wherein providing the camshaft main body further includes pushing the camshaft main body through a hub of the at least one sliding cam and a hub of the receiving elements and through at least one of a passage opening of a bearing frame and a passage opening of a cylinder head cover.

3. The method according to claim 1, wherein joining the drive wheel to the camshaft main body includes fixing the drive wheel on the first axial section via welding to define at least one of a form fit connection and a shrink fit connection.

4. The method according to claim 3, wherein welding includes at least one of laser welding and friction welding.

5. The method according to claim 1, wherein the predefined angular position of at least one of the receiving elements is defined before or after the receiving elements are pushed onto the camshaft main body.

6. The method according to claim 1, wherein the at least one receiving element includes at least one of a cam, a sensor wheel, a bearing ring, a rolling bearing and a gearwheel.

7. The method according to claim 1, wherein providing the camshaft main body further includes forming a stepped transition between at least one of (i) the first axial section and the second axial section and (ii) the second axial section and the third axial section.

8. A method for producing an assembled camshaft, comprising the steps of:
providing a camshaft main body having a longitudinal axis, the camshaft main body including:
a first axial section having a smooth cylindrical outer profile and an outer diameter $d_1$, a second axial section disposed between the first axial section and a third axial section, the second axial section including a toothing extending in an axial direction, wherein the second axial section via the toothing defines a tip circle diameter $d_K$ and a root circle diameter $d_F$, the third axial section having a smooth cylindrical outer profile and an outer diameter $d_3$, wherein $d_1 < d_F$ and $d_3 < d_F$, thermally joining at least one receiving element to the first axial section in a predefined angular and axial position, the at least one receiving element having an opening for receiving the camshaft main body;

pushing at least one sliding cam onto the second axial section in a predefined angular position;

thermally joining at least one other receiving element to the third axial section in a predefined angular and axial position, the at least one other receiving element having an opening for receiving the camshaft main body; and joining a drive wheel to a free end of the first axial section.

9. The method according to claim 8, wherein joining the drive wheel to the camshaft main body includes fixing the drive wheel on the first axial section via welding to define at least one of a form fit connection and a shrink fit connection.

10. The method according to claim 9, wherein welding includes at least one of laser welding and friction welding.

11. The method according to claim 8, wherein the predefined angular position of at least one of the receiving elements is defined before or after the receiving elements are pushed onto the camshaft main body.

12. The method according to claim 8, wherein providing the camshaft main body further includes forming a stepped transition between at least one of (i) the first axial section and the second axial section and (ii) the second axial section and the third axial section.

13. The method according to claim 8, wherein, after providing the camshaft main body, further including the step of pushing the camshaft main body through a hub of the at least one sliding cam and a hub of the receiving elements and through at least one of passage opening of a bearing frame and a passage opening of a cylinder head cover.

14. An assembled camshaft, comprising:

a camshaft main body having a longitudinal axis and including:

a first axial section having a smooth cylindrical outer profile and an outer diameter $d_1$;

a second axial section disposed between the first axial section and a third axial section, the second axial section having an outer profile including a toothing extending in an axial direction, wherein the second axial section via the toothing defines a tip circle diameter $d_K$ and a root circle diameter $d_F$;

the third axial section having a smooth cylindrical outer profile and an outer diameter $d_3$;

a drive wheel coupled to a free end of the first axial section;

at least one receiving element having an opening for receiving the camshaft main body, the at least one receiving element arranged rotationally and axially fixed on the camshaft main body, wherein the at least one receiving element is disposed on at least one of the first axial section and the third axial section;

at least one sliding cam arranged rotationally fixed and axially displaceable on the second axial section;

wherein the at least one receiving element is thermally joined to the camshaft main body and defines at least one of a form fit connection and a shrink fit connection; and wherein the camshaft main body is a stepped and hollow shaft.

15. The camshaft according to claim 14, wherein the at least one receiving element includes at least one of a cam, a sensor wheel, a bearing ring, a rolling bearing and a gearwheel.

16. The camshaft according to claim 14, wherein the at least one receiving element has a hub defining a friction-increasing structure.

17. The camshaft according to claim 14, wherein the camshaft main body is stepped at a transition between at least one of (i) the first axial section and the second axial section and (ii) the second axial section and the third axial section.

18. The camshaft according to claim 14, wherein the camshaft main body defines the following relationship: $d_1 > d_K$ and $d_F > d_3$.

19. The camshaft according to claim 14, wherein the camshaft main body defines the following relationship: $d_1 < d_F$ and $d_3 < d_F$.

* * * * *